July 14, 1964  R. H. MERRICK  3,140,589
ABSORPTION REFRIGERATION SYSTEMS
Filed Feb. 11, 1963
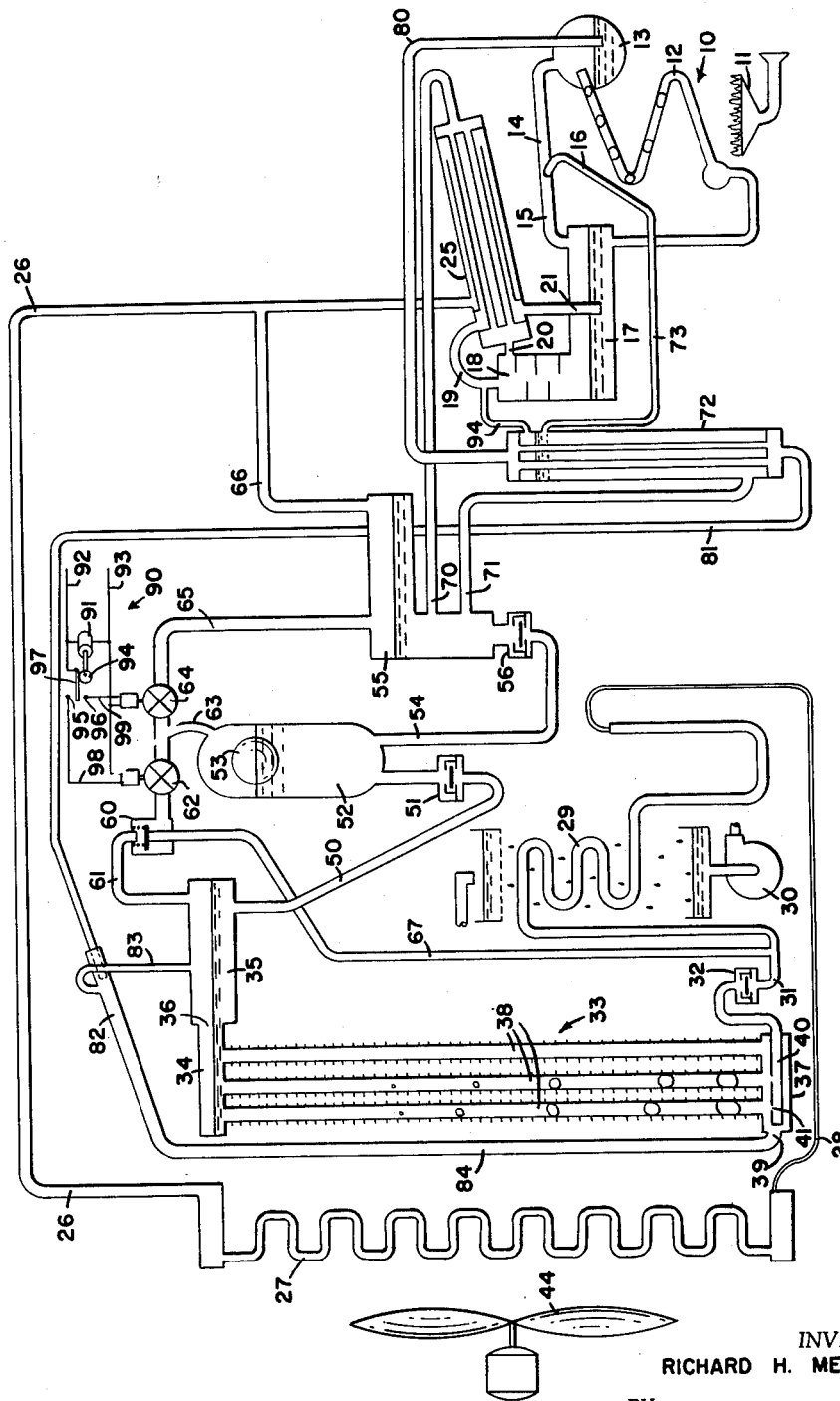
INVENTOR.
RICHARD H. MERRICK.
BY Frank N. Decker Jr.
ATTORNEY.

United States Patent Office
3,140,589
Patented July 14, 1964

3,140,589
ABSORPTION REFRIGERATION SYSTEMS
Richard H. Merrick, Indianapolis, Ind., assignor to Carrier Corporation, Syracuse, N.Y., a corporation of Delaware
Filed Feb. 11, 1963, Ser. No. 257,575
6 Claims. (Cl. 62—232)

This invention relates to absorption refrigeration systems and, more particularly, to an improved solution transfer mechanism for transferring solution from an absorber section to a generator section of an absorption refrigeration machine.

In an absorption refrigeration machine, absorbent solution and refrigerant are separated in a generator section by boiling which vaporizes the refrigerant thereby concentrating the absorbent solution. The high pressure vaporized refrigerant is then condensed in a condenser section. These sections are generally referred to as the "high side" of the refrigeration system. The concentrated absorbent solution is then passed to the absorber section for absorption of refrigerant vapor. The condensed refrigerant is passed to the evaporator or cooling section where it is vaporized providing the desired cooling or refrigeration effect, and the vaporized refrigerant is then passed to the absorber section for absorption into the concentrated absorbent solution. These sections are generally referred to as the "low side" of the refrigeration system because the pressures therein are substantially lower than those in the previously described high side.

In order to make the process continuous, it is necessary to return the absorbent solution having absorbed refrigerant therein back to the generator section for reseparation. This requires that the absorbent solution be passed from a region of relatively low pressure to a region of relatively high pressure through the use of a pump or some other type of transfer mechanism, such as described in Patent No. 3,038,320, granted June 12, 1962, over which the present invention is an improvement.

However, previously used transfer mechanisms have occasionally exhibited certain disadvantages which it is an object of this invention to overcome. For example, in the previously referred to patent, a solution trap vessel is used to transfer solution from the low side to the high side of an absorption refrigeration system. This arrangement is highly satisfactory in that it eliminates the disadvantages of pumps or other transfer mechanisms which may exhibit operational difficulties. Such a system is actuated by a float controlled switch responsive to the height of solution in the float chamber. Consequently, the system requires that the solution trap be filled to a predetermined height with solution before any solution is transferred from the low side to the high side. However, it has been discovered that under some conditions, such as initial start-up of a system, very little solution may be forwarded from the generator section to the absorber section for a substantial period of time after start-up and, consequently, the normal functioning of the system is retarded.

In addition, at start-up of the system, the generator may actually run partially dry allowing vapor to enter and pass through the liquid line, which normally feeds absorbent solution to the absorber. This condition may cause further erratic operation of the system which retards entry of solution into the trap by tending to pressurize it.

In accordance with this invention, this abnormal behavior of the refrigeration system is avoided by feeding the solution remaining in the trap to the generator section immediately on start-up. Furthermore, the operation of the refrigeration system during periods of initial start-up can be smoothed out if the trap continues to forward solution from the absorber section to the generator section without reference to the level of solution in the trap.

Accordingly, it is a principal object of this invention to provide an improved method and apparatus for the transfer of solution from the low side to the high side of an absorption refrigeration system.

This and other objects of this invention are achieved in the illustrated preferred embodiment thereof by providing a solution trap chamber having associated therewith a pair of solenoid valves for venting and pressurizing the trap chamber according to a predetermined timed interval which is controlled independently of the height of solution in the trap chamber. By this means, the trap is also enabled to smooth out system operation by discharging its contents into the generator section without regard to the quantity of solution therein on start-up. Furthermore, since the trap chamber need not be full of solution in order to transfer solution from it, there is provided above the level of solution a substantial vapor space by which the initial in-rush of high pressure refrigerant vapor is cushioned so as to prevent fluttering of the valve which prevents communication between the trap chamber and the absorber section during the discharge portion of the trap cycle. This effectively prevents refrigerant vapor from pressurizing the absorber section where it would very materially degrade the performance of the system, while at the same time obviates the necessity of utilizing specially designed or more expensive valves. Furthermore, this invention provides a trap cycle control which is independent of solution level and inherently simple, reliable, and inexpensive.

These and other objects of this invention will become more apparent by a consideration of the following detailed description and the attached drawing which schematically represents a cross-section through an improved absorption refrigeration system in accordance with this invention.

Referring particularly to the drawing, there is provided a generator section 10 having a heat source 11, such as a gas fired burner. Absorbent solution having refrigerant absorbed or dissolved therein is supplied to the generator section and flows through generator tubes 12, which are heated by burner 11. Heating of the solution causes the refrigerant to be vaporized or boiled out of the absorbent solution. The resulting mixture of vaporized refrigerant and hot absorbent solution is passed into separation chamber 13.

A suitable absorbent for a refrigeration system of the type herein described is water, and a suitable refrigerant is ammonia. As used in this description, the absorbent solution which is collected in separation chamber 13 may be thought of as being a relatively strong solution because the solution is strong in absorbing power. Conversely, the absorbent solution passed to the generator may be thought of as being a relatively weak solution because it has a substantial quantity of refrigerant absorbed therein and the solution is therefore weak in absorbing power.

Since the absorbent, which may be water, and the refrigerant, which may be ammonia, are both volatile, some absorbent vapor is carried into vapor passage 14 along with the refrigerant vapor which has been distilled from the weak absorbent solution passed into the generator section. This mixture of absorbent and refrigerant vapor passes through a preanalyzer section or passage 15 wherein it flows concurrently with weak solution passed into the preanalyzer section from a weak solution line 16. The resulting gas and liquid contact in the preanalyzer section gives rise to a mass and heat transfer effect by which some of the absorbent vapor, which is relatively less volatile than the refrigerant vapor and therefore is more easily condensed, is condensed, thereby purifying the refrigerant vapor.

The refrigerant vapor is then passed along with the condensed absorbent solution into generator reservoir 17, which contains a quantity of absorbent solution in the bottom thereof. The refrigerant vapor passes over the top of the absorbent solution in generator reservoir 17 and up through analyzer section 18. Weak solution passes from a weak solution passage 20 over a series of plates or other suitable analyzer packing material in contact with the refrigerant vapor. A mass and heat transfer again takes place in analyzer section 18 to further purify the refrigerant vapor by condensing the relatively less volatile absorbent vapor.

The purified refrigerant vapor is then passed from the analyzer section through vapor passage 19 into rectifier section 25. Rectifier section 25 comprises a heat exchanger wherein relatively cool weak solution is passed through the heat exchanger and out weak solution passage 20 in heat exchange relation with the refrigerant vapor. The cool weak solution therefore condenses further absorbent vapor from the refrigerant vapor and the condensed absorbent solution is passed through a drain passage 21 in the heat exchanger to generator reservoir 17.

The thus highly purified refrigerant vapo ris then passed through vapor passage 26 into condenser section 27 of the absorption refrigeration system. Air or other suitable ambient cooling fluid is passed over the exterior of the heat exchange tubes which form condenser section 27 to cool and condense the refrigerant vapor passed thereto.

The condensed refrigerant liquid passes through a restriction device 28, such as a capillary tube, and into the coil of a chiller section 29. Water or other heat exchange fluid to be cooled is passed over the exterior of the coil in chiller section 29 and heat is extracted from the heat exchange fluid which is then passed by pump 30 to a suitable location to provide the desired refrigeration effect in the region to be refrigerated or air conditioned. The heat extracted from the heat exchange fluid is absorbed by the refrigerant liquid causing the refrigerant to again vaporize in the coil of chiller section 29.

The vaporized refrigerant is then passed through passage 31 having a check valve 32 therein to absorber section 33. Absorber section 33 comprises an upper header 34 having an outlet passage 36 for discharging weak absorbent solution into inlet tank 35. Absorber section 33 is also provided with a lower header 37 and a plurality of absorber tubes or passages, generally designated 38, having open ends communicating with the upper and lower headers. Absorber tubes 38 permit the flow of absorbent solution between upper and lower headers 34 and 37.

Preferably, absorber tubes 38 are spaced from one another and provided with suitable fins so that air or other ambient cooling fluid may be passed over the absorber tubes to cool the absorbent solution therein. It will be appreciated that a single fan 44 may be used to pass air over absorber tubes 38 and the heat exchange coil or tubes in condenser section 27, if desired.

A refrigerant vapor inlet distributor 40 is provided in lower header 37 and is connected to refrigerant vapor line 31, as shown in the drawing, to admit refrigerant vapor into the open ends of certain predetermined absorber tubes 38 through orifices 41 in the distributor.

In operation, the absorber tubes 38 having associated adjacent inlet orifices have a mixture of refrigerant vapor and absorbent solution flowing through them from lower header 37 toward upper header 34. As the mixture of vapor and solution rises upwardly in absorber tubes 38, the refrigerant vapor is absorbed into the absorbent solution so that very little, if any, refrigerant vapor reaches upper header 34. At the same time, the absorber tubes 38 which do not have adjacent refrigerant vapor orifices are permitted to carry absorbent solution downwardly from upper header 34 to lower header 37 in a controlled recirculation pattern throughout the absorber.

By controlling and optimizing the pattern of recirculation within the absorber, it is assured that all of the absorber tubes into which vapor is injected function to efficiently absorb vapor.

The weak absorbent solution having dissolved therein considerable refrigerant vapor is passed through outlet 36 of absorber section 33 into inlet tank 35. From inlet tank 35, the weak solution flows through passage 50, solution check valve 51 into solution trap 52. Weak solution flows from solution trap 52 through outlet passage 54 and check valve 56 into outlet tank 55, as will subsequently be described.

From outlet tank 55, the weak solution is divided into two portions. The first portion of the weak solution flows through passage 70 through the interior of rectifier 25, passage 20 and analyzer 18 into generator reservoir 17, thereby condensing absorbent vapor into the rectifier and analyzer as previously described.

The other portion of the weak solution is passed from outlet tank 55 through passage 71 into heat exchanger 72 where it is warmed. After passing through the heat exchanger, the warmed weak solution passes through passage 73 into preanalyzer section 15, where it initially condenses some absorbent vapor passing through the preanalyzer section from generator section 10 to generator reservoir 17, as previously described.

A low pressure valve 62 is provided to vent trap 52 through passage 63, blow-down valve 60, and pressure equalizer line 61 to the inlet tank when valve 62 is open. Under these circumstances, high pressure valve 64 in pressure equalizer line 65 leading from outlet tank 55 is closed. When weak solution has drained into trap 52 from tank 35 low pressure valve 62 is closed and high pressure valve 64 is opened, thereby pressurizing the trap chamber with high side refrigerant vapor from outlet tank 55 which is pressurized through refrigerant vapor line 66. This causes trap 52 to drain weak solution through line 54 into outlet tank 55.

After trap 52 has drained, suitable control mechanism automatically opens low pressure valve 62 and closes high pressure valve 64 to repeat the solution transfer cycle. Initially upon opening of low pressure valve 62 residual pressure acting on the underside of the diaphragm blow-down valve 60 opens the blow-down valve so as to vent the pressure in the trap through line 67 to vapor distributor 40 in the bottom of absorber section 33.

Low pressure valve 62 and high pressure valve 64 are preferably of the electrical solenoid actuated type, although it will be appreciated that any type of valve control mechanism may be utilized by making appropriate modifications to the timing circuit. A timing circuit 90 is provided for actuation of valves 62 and 64 to provide a predetermined trap operation cycle. A timer motor 91, which may be any suitable electric motor, such as a synchronous motor, is connected across a suitable electrical line having conductors 92 and 93. Timer motor 91 is connected by a shaft to a timer cam 94, which actuates a timer switch having contacts 95, 96 and 97. Contact 97 is connected to one side of the line 92. The solenoids of valves 62 and 64 are each connected to the other side of the line 93 and to one side of the timer switch through conductor lines 98 and 99 respectively. Depending upon the position of timer cam 94, conductor 92 of the line is connected to either line 98 or 99 for actuation of either solenoid valve 62 or 64 respectively.

The valves may be of the normally closed type which are opened when energized by being connected across the line. Consequently, either valve 62 or 64 is opened, depending upon the position of timer cam 94. Since motor 91 may be of the synchronous electric type having a constant speed rotation, the motor provides a predetermined time interval between the opening and closing of valves 62 and 64. It will be noted that when either of the valves 62, 64 is open the other valve is closed.

On start-up of the refrigeration system, timer motor 91 is also started and it is assured that timer cam 94 will always reach a position in a short time such that high pressure valve 64 is opened and low pressure valve 62 is closed so that high pressure vapor will flow from the generator through lines 26 and 66, through outlet tank 55, line 65, valve 64 and line 63 into the top of trap chamber 52. This serves to positively expel the solution contents of trap 52 irrespective of erratic initial operation of the absorption refrigeration system. After a period of time which is determined by the shape of timer cam 94 and the speed of rotation of timer motor 91, high pressure valve 64 is closed and low pressure 62 is opened. Opening of low pressure valve 62 vents the space at the top of trap chamber 52 to low side pressure in the inlet tank and the absorber section, as has been previously described, thereby permitting solution to run into trap chamber 52 from inlet tank 35.

Trap chamber 52 is preferably sized in relation to solution passage 50 and timer circuit 90 so that, under conditions of maximum operating load, trap chamber 52 is not completely filled with solution during the time which the timer circuit permits low pressure valve 62 to remain open. Consequently, there remains a vapor space at the top of trap chamber 52. A suitable float 53 may be provided in the trap chamber to inhibit absorption of vapor at the surface of absorbent solution therein when the warm high pressure gas from the high side of the system is admitted to the chamber upon opening of valve 64.

The presence of a vapor space in the upper portion of trap chamber 52 cushions the in-rush of high pressure vapor through line 65 and reduces the tendency of valve 62 being forced open by the sudden in-rush of high pressure vapor. It will be apparent that it is highly desirable to prevent valve 62 from being opened under these conditions since an excess of high pressure vapor, if passed through valve 62, would undesirably raise the absorber pressure and markedly reduce the overall efficiency of the refrigeration system.

It will also be apparent that cam 94 and motor 91 may be so arranged to provide any desired time interval for the initiation of the inlet and discharge portions of the trap cycle. Likewise, any tendency of the generator section to run dry upon initial start-up of the system is minimized by assuring that the contents of solution trap 52 are positively discharged into the generator section irrespective of the solution level in the trap chamber.

One of the disadvantages of prior systems was that if a valve became stuck in the open position during operation of the trap cycle the trap was unable to function because the solution level would fail to reach the level necessary for operation of the next portion of the cycle. It will be apparent that by the practice of this invention, the trap will operate normally because the valve will be able to reseat itself on the next cycle irrespective of the solution level in the trap chamber.

The passage of the refrigerant vapor formed in generator section 10 has been now described. The strong solution which also results from the distillation of refrigerant vapor from the weak solution in the generator is collected in separator 13 and passes through passage 80 through the interior of heat exchanger 72, where the hot strong solution is cooled by heat exchange with the relatively cool weak solution passing through line 71, as previously explained. From heat exchanger 72, the strong solution passes through line 81 into the subcooled absorber section 82 and passage 84 to inlet 39 in lower header 37 of absorber section 33. A vent line 83 is provided between vapor space at the top of inlet tank 35 and subcooled absorber section 82 to induce unabsorbed refrigerant vapor in the top of the inlet tank into the cooled strong solution for better cycle efficiency, as more completely described in Patent No. 3,038,316, granted June 12, 1962.

It will be appreciated that by the practice of this invention there is provided a trap chamber solution transfer device for an absorption refrigeration system and a method of operating an absorption refrigeration system which overcomes many of the disadvantages of prior systems, and which results in positive operation of the trap cycle independently of transient system malfunctions.

It will also be appreciated that the foregoing description is illustrative of a preferred embodiment of this invention, and that the invention may be otherwise embodied within the scope of the following claims.

I claim:
1. In an absorption refrigeration system having a high pressure side and a low pressure side, a solution transfer arrangement for transferring solution from the low pressure side of said system to the high pressure side thereof, comprising:
   a trap chamber,
   solution inlet passage means for admitting solution into said trap chamber from the low pressure side of said system,
   solution outlet passage means for discharging solution from said trap chamber to the high pressure side of said system,
   high pressure vapor passage means adapted to supply vapor under pressure to said chamber to expel solution therein through said outlet passage,
   low pressure vapor passage means adapted to vent said chamber to a low pressure region to admit solution into said trap chamber from the low pressure side of said system,
   valve means in said vapor passages, and
   timing means associated with said valve means to alternately vent or pressurize said strap chamber in accordance with predetermined time intervals to transfer solution in said trap chamber from the low side of said system to the high side thereof in accordance with a predetermined maximum time interval.

2. An absorption refrigeration system as defined in claim 1 wherein said means associated with said valve means comprises an electric motor and wherein said valve means is electrically actuated by switches controlled by the rotation of said electric motor.

3. In an absorption refrigeration system having a relatively high pressure generator section and a relatively lower pressure absorber section,
   a solution transfer device comprising a trap chamber,
   solution inlet passage means to admit absorbent solution from said absorber section into said trap chamber,
   solution discharge passage means for discharging absorbent solution from said trap chamber to a portion of said generator section,
   low pressure vapor passage means for equalizing the pressure between said absorber section and said trap chamber,
   a high pressure vapor passage for pressurizing the interior of said trap chamber to expel solution therein through said solution discharge passage,
   valve means associated with said vapor passages for equalizing the pressure in said trap chamber to said absorber section pressure and alternately pressurizing said trap chamber to discharge accumulated solution therein through said discharge passage, and
   timer means associated with said valve means arranged to automatically actuate the alternate functions of said valve means so that during operation of said system said functions initiated in accordance with a predetermined maximum period of time.

4. An absorption refrigeration system as defined in claim 3 wherein said timer means comprises a constant speed electric motor and wherein the initiating of said discharge cycle is controlled by said constant speed electric motor which provides a predetermined time interval.

5. An absorption refrigeration system as defined in claim 3 wherein said timer means is adjusted to provide a time cycle in relation to the size of said passages such that said trap chamber is less than completely filled with solution on the inlet portion of the cycle before the discharge portion of the cycle is initiated so that said trap chamber is not completely filled with solution under conditions of maximum refrigeration load.

6. An absorption refrigeration system as defined in claim 5 wherein float means is provided in said trap chamber to reduce the surface of solution exposed therein and consequent absorption of vapor when the interior of said trap chamber is exposed to high pressure vapor.

References Cited in the file of this patent

UNITED STATES PATENTS

| | | |
|---|---|---|
| 2,128,251 | Jaeger et al. | Aug. 30, 1938 |
| 2,552,071 | Terrill | May 8, 1951 |